United States Patent [19]

Smith

[11] Patent Number: 5,335,718
[45] Date of Patent: Aug. 9, 1994

[54] SPACE-EFFICIENT AIR CONDITIONING/HEATING MODULE

[75] Inventor: Calvin G. Smith, Dearborn Heights, Mich.

[73] Assignee: Ford Motor Company, Dearborn, Mich.

[21] Appl. No.: 862,033

[22] Filed: Apr. 2, 1992

[51] Int. Cl.⁵ .............................................. F25B 29/00
[52] U.S. Cl. ........................................ 165/42; 165/43; 454/161; 454/127
[58] Field of Search ............... 165/42, 43; 454/161, 454/127

[56] References Cited

U.S. PATENT DOCUMENTS

| | | | |
|---|---|---|---|
| 2,640,407 | 6/1953 | Aufiero | 454/161 |
| 3,260,187 | 7/1966 | Nallinger | 454/161 |
| 3,421,576 | 1/1969 | Roane | 165/42 |
| 4,143,706 | 3/1979 | Schnaibel et al. | 165/43 |
| 4,453,591 | 6/1984 | Fehr | 165/42 |
| 4,476,773 | 10/1984 | Fehr | 454/156 |
| 4,534,507 | 8/1985 | Matsuda | 454/161 |
| 4,574,873 | 3/1986 | Kawahira et al. | 165/42 |
| 4,821,792 | 4/1989 | Bednarek | 165/43 |
| 4,900,228 | 2/1990 | Yapp | 416/183 |
| 5,105,730 | 4/1992 | Smith | 454/161 |

FOREIGN PATENT DOCUMENTS

| | | | |
|---|---|---|---|
| 3229866 | 2/1984 | Fed. Rep. of Germany | 165/43 |
| 0113715 | 6/1985 | Japan | 165/43 |
| 0182530 | 7/1990 | Japan | 165/42 |
| 884918 | 12/1961 | United Kingdom | 165/42 |

*Primary Examiner*—John K. Ford
*Attorney, Agent, or Firm*—Raymond L. Coppiellie; Roger L. May

[57] ABSTRACT

A space-efficient heating and air conditioning module for a motor vehicle includes radially inwardly directed air handling ducts and a coaxial rotary blower, evaporator, and heater core. A defrost supply duct communicates heated or conditioned air above the evaporator and heater core in a direction 180° from the direction of air flow through the rotary blower, evaporator, and heater core. The air flow is automatically thermally stratified, to provide the warmest air to the floor vent. The module is compact, and is centrally mountable for use in left- or right-hand drive vehicles.

8 Claims, 1 Drawing Sheet

SPACE-EFFICIENT AIR CONDITIONING/HEATING MODULE

FIELD OF THE INVENTION

The present invention is directed to a space-efficient air conditioning/heating module. More particularly, the present invention contemplates an air conditioning/heating module which is compact, and may be placed entirely within the central portion of a left- or right-hand drive vehicle dashboard.

BACKGROUND OF THE INVENTION

Vehicle air conditioning/heating systems are well-known in the prior art, and typically comprise an assemblage of heat exchangers, blowers, temperature sensors, air flow diversion mechanisms, refrigerant flow conduits, controllers, etc. These system elements are generally installed at various locations throughout the vehicle engine compartment and dashboard, and are interconnected via air handling ducts.

The prior art systems for ducting heated and conditioned air to the vehicle interior require large amounts of space to accommodate the above-mentioned system elements. The packaging requirements for climate control systems for vehicles are becoming more important due to the downsizing and weight-reducing programs for modern vehicles. Furthermore, efforts are being directed toward conserving space and weight in all areas of the climate control system. Moreover, manufacturing costs are always an important issue, and the utilization of modular, space-efficient system components will result in an overall reduction in the cost of manufacturing a motor vehicle.

It would be desirable to produce a space-efficient air conditioning/heating module which could be installed entirely within the dashboard of a vehicle and which could be center-mounted and therefore useful for both left- or right-hand drive vehicles.

SUMMARY OF THE INVENTION

Accordant with the present invention, there surprisingly has been developed an air conditioning/heating module which is center-mountable within the dashboard of a vehicle. This air conditioning/heating module can support future styling trend modifications, and can satisfy more demanding customer comfort requirements. The inventive air conditioning/heating module balances compact packaging requirements and air conditioning and heating performance expectations with noise and electrical power consumption limitations.

The air conditioning/heating module according to the present invention is characterized by a low pressure drop, thereby providing for a high air flow and low noise generation. It incorporates a stacked evaporator and heater core for a straight-through air flow path. This arrangement minimizes air flow velocity losses, blower power consumption, and turbulent air flow noise generation. The inventive module may include integral floor, panel, and defrost air distribution ducts. The module may also be used in conjunction with cross-dashboard air handling conduits, to supply heated or conditioned air to outboard registers. The temperature of the air discharged from the module may be controlled via electronic refrigerant and engine coolant control valves, which regulate the flows of refrigerant and engine coolant to the evaporator and heater core, respectively, to obtain the desired amount of reheat to temper the discharged conditioned air.

Fresh air enters the inventive module through a blower assembly. The blower includes an integral recirculating/outside air door mechanism, which selectively may be driven between a recirculating air position and an outside air position or any combination thereof, by conventional dampers or a conventional rotary door. In the outside position, air enters the blower directly from the center cowl area. In the recirculating air position, the dampers or door mechanism are positioned to allow air to be drawn into the blower from the passenger compartment of the vehicle. Alternatively, the dampers or door mechanism may be positioned at an intermediate location, thereby allowing a mixture of recirculating air and outside air to be drawn into the blower. The blower is selected to provide a uniform axial flow of recirculating air or outside air, or any combination thereof, to the evaporator. The axial air flow generated by the blower is evenly distributed across the face of the evaporator, thereby maximizing the efficiency of heat exchange between the evaporator and the flowing air stream. The module utilizes a thin evaporator core which, when combined with a large face area, will supply conditioned air at a uniform discharge temperature with minimal pressure drop. In a preferred embodiment of the present invention, there is a gap of approximately one inch between the evaporator and a heater core which is positioned downstream therefrom, to allow for condensate drainage and to prevent rehumidification of the air which might otherwise occur if the evaporator and heater core were close enough together to allow airborne condensate to be carried directly from the evaporator into the heater core.

The heater core face area is substantially the same as the face area of the evaporator, to minimize air flow velocity changes due to expansion or contraction. This reduces air flow turbulence and related noise generation. Vehicle engine coolant enters the heater core at the lower header and exits the heater core at the upper header. This engine coolant flow configuration intentionally stratifies the air leaving the heater core in a desirable fashion. Air exiting from the lower portion of the heater core is warmer than the air exiting from the upper portion of the heater core. Thus, in the panel/floor or defrost/floor mode, the warmest air is automatically channeled to the vehicle occupant's feet, while cooler warm air is directed to the remainder of the passenger compartment for improved comfort.

The discharge air temperature may be controlled by means of electrically actuated flow control devices mounted in the engine compartment. Such flow control devices are well-known, and may comprise, for example, a simple butterfly bypass valve. In such a system, refrigerant or engine coolant continuously flows through the valve; only the amount of refrigerant or engine coolant necessary to obtain the desired discharge air temperature is then diverted to the evaporator or heater core and recirculated back to the supply loop.

The discharge air distribution apparatus may be of any type generally known in the art. One particularly useful air distribution apparatus is disclosed in recently allowed U.S patent application Ser. No. 07/628,965, now U.S. Pat. No. 5,105,730, and comprises a flexible film valving system, wherein an apertured film may be driven between various positions, to provide varying amounts of air flow between floor, panel, and defrost ducts.

BRIEF DESCRIPTION OF THE DRAWING

The novel features that are considered characteristic of the invention are set forth with particularity in the appended Claims. The invention will best be understood, however, by reference to the accompanying description of specific embodiments when read in connection with the attendant FIGURE which is a perspective view, partially cut away, illustrating an embodiment of the air conditioning/heating module of the present invention.

DETAILED DESCRIPTION OF THE PREFERRED EMBODIMENT

Figure 1:
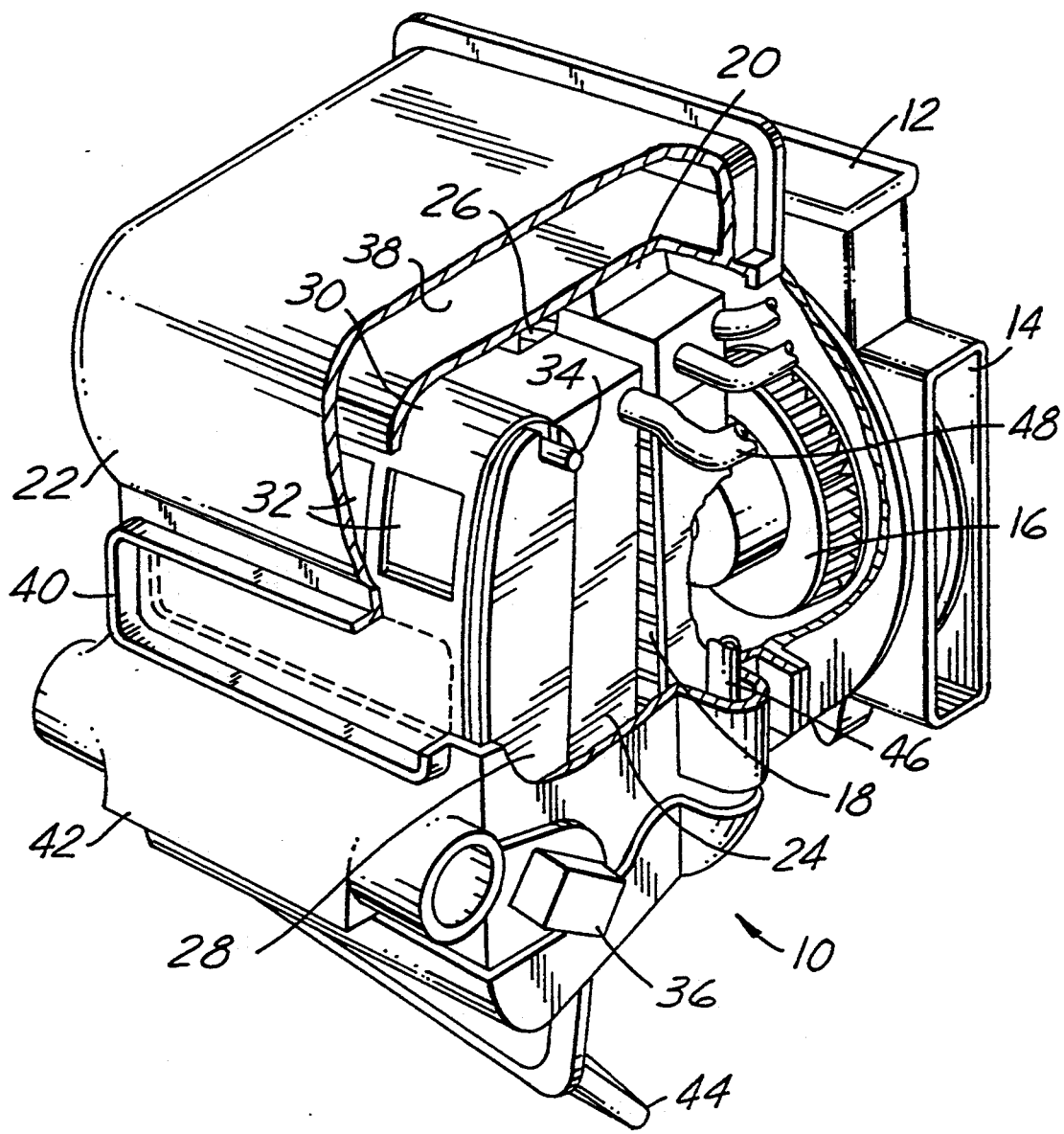

The present invention is directed to a space-efficient air conditioning/heating module which is center-mountable within the dashboard of a vehicle. The configuration of the module is substantially identical whether mounted in a left- or right-hand drive vehicle. The module comprises fresh air ducts for admitting radially inwardly directed flows of recirculating air and/or outside air. The inlet ducts change the radially directed flow of incoming air to an axial direction, into the intake of an adjacent rotary blower. Practically the only modification required for either left- or right-hand drive vehicles is the rotation of the intake air ducts to allow air to be drawn either from the outside of the vehicle or generally from the passenger side of the vehicle compartment in the recirculation mode. The rotary blower discharges the air immediately through a series of adjacent heat exchangers. The first heat exchanger is an air conditioning evaporator; the second spaced-apart heat exchanger is an engine coolant heater core. Although an engine coolant heater core is described as the preferred embodiment, it is to be understood that other forms of heat exchange may be used, e.g., a resistance-type ceramic heating element. The evaporator and heater core have substantially the same face areas. Vehicle engine coolant enters the heater core at the lower header and exits the heater core at the upper header. A discharge air distribution device directs the heated or conditioned air to any or a combination of floor, panel, and defrost air ducts.

Referring now to FIG. 1, there is shown generally at 10 an air conditioning/heating module according to the present invention. The module 10 includes an outside air inlet 12 and a recirculating air inlet 14 for providing air to a rotary blower 16. A preferred blower is set forth in U.S. Pat. No. 4,900,228 which is incorporated herein in its entirely by reference thereto. It is also contemplated that other rotary blowers may be utilized in the present invention. Air then passes from the blower 16 evenly through an evaporator 18. A seal 20 is provided between an outer duct housing 22 and the evaporator 18, to cause substantially all of the air to pass through the evaporator 18.

Air continues to flow from the evaporator 18 through a heater core 24. A core seal 26 is provided between the heater core 24 and the outer duct housing 22, to prevent air from bypassing the heater core 24. Air from the heater core 24 then passes immediately into a distribution system. The distribution system disclosed in the FIGURE includes a chamber 28 and a flexible film 30 containing a plurality of apertures 32. The apertures 32 may be moved up or down by winding or unwinding the film 30 around a spring-loaded spindle 34 by means of reversible drive motor 36 attached to a second spindle (not shown). Alternatively, a motor may be attached to each spindle, individually, selectively to drive the flexible film 30 back and forth between the spindles. The movement of the apertures 32 allows the flow of conditioned/heated air to flow into one or a combination of three distribution zones; an upper defrost supply duct 38, a middle dashboard vent 40, or a lower floor duct 42. The characteristics and operation of the illustrated distribution system are fully set forth in allowed U.S. patent application Ser. No. 07/628,965, now U.S. Pat. No. 5,105,730, which is incorporated herein in its entirely by reference thereto.

A particularly critical aspect of the present invention is the space-efficient arrangement of the air handling, heating, and cooling components of the inventive module 10. This arrangement provides compact packaging of the components, making the module 10 center-mountable for use in either right- or left-hand drive vehicles, while having the ability to supply thermally stratified air without the need for complex damper and ducting systems. Moreover, the configuration of the module 10 provides styling and considerable safety advantages. The evaporator 18 and heater core 24 are arranged to be substantially parallel, with their major surfaces substantantially normal to the direction of travel of the motor vehicle. Upon vehicle crash impact, the evaporator 18 and heater core 24 would collapse together, and not present edges which could seriously injure vehicle occupants thrust against the vehicle dashboard.

The axis of the rotary blower 16 is substantially normal to the faces of both the evaporator 18 and heater core 24, which are spaced-apart only to the degree necessary to substantially prevent rehumidification of the air exiting the evaporator 18. Moreover, the evaporator 18 may be tilted slightly from a position parallel to the heater core 24, to assist in preventing the rehumidification of air exiting the evaporator 18. This allows condensate to more easily drain from the evaporator 18. Air enters the module 10 from one or a plurality of radially inwardly directed inlets, e.g., 12 and 14. The air entering the module 10 through any one of the inlets 12 and 14 may be selected by conventional means, such as for example by the use of individually controlled dampers in each inlet duct (not shown), or by the use of a rotary door such as that disclosed in U.S. Pat. No. 4,476,773. Moreover, the air distribution system is designed to route the flow of conditioned/heated air to be used for defrosting purposes above the evaporator 18 and heater core 24, in a direction substantially 180° from the direction of the air flow passing through the rotary blower 16, evaporator 18, and heater core 24. Thus, the defrost supply duct 38 lies above the evaporator 18 and heater core 24, and communicates defrost air in a direction substantially 180° from the direction of the air flow passing through the rotary blower 16, evaporator 18, and heater core 24. In vehicles which include futuristic styling, this allows the introduction of defrost air at the base of the windshield in a quiet and efficient manner.

The module 10 incorporates a heater core 24 which accepts a flow of engine coolant at its lower header and discharges that flow of engine coolant from its upper header, to provide intentionally thermally stratified air to the distribution system. As disclosed previously, other heat exchange elements, e.g., resistance-type ceramic heating elements, may be used and conventionally controlled to provide intentionally thermally stratified air.

The outer duct housing 22 includes a condensate drain tube 44 for eliminating any condensate that is produced within the module 10. The condensate drain tube 44 is disposed at an angle of about 30° to allow drainage, even if the vehicle is parked on a grade.

The outer duct housing 22 additionally is provided with the floor duct 42, with air distribution openings in the bottom thereof (not shown) for directing heated/conditioned air downwardly toward the feet of the vehicle occupants. The floor duct 42 may also have air distribution openings in the sides thereof, as shown. It will be apparent to those ordinarily skilled in the art that more than three duct systems may be supplied with conditioned or heated air from the distribution system. For example, separate ducts may be run to the rear of the passenger compartment to supply conditioned or heated air directly to the rear passengers.

The rotary blower 16 supplies air evenly over the face of the evaporator 18, thence evenly over the face of the heater core 24. Furthermore, refrigerant and engine coolant are supplied to the evaporator 18 and heater core 24, respectively, by means of fluid flow regulating valves well-known in the art. These characteristics allow for the conditioned/heated air to be thermally stratified by supplying engine coolant to the bottom of the heater core 24 via an inlet tube 46, and removing engine coolant from the top of the heater core via an outlet tube 48. Thus, air flowing through the lower portion of the heater core 24 will be substantially warmer than the air flowing through the upper portion of the heater core 24. This provides the ability to direct air toward the floor of the vehicle which is substantially warmer than the air which is directed to the dashboard vent 40 or the defrost duct 38. Such a feature is extremely desirable for passenger comfort.

As will be evident to those ordinarily skilled in the art, it is possible for the air temperatures discharged from various portions of the air distribution system automatically to be controlled by providing temperature sensors within the air flow paths. Such temperature sensors generate signals which may be directed to a feedback loop to activate a microprocessor which manages the flows of refrigerant and engine coolant to the evaporator 18 and heater core 24, respectively.

From the foregoing description, one ordinarily skilled in the art can easily ascertain the essential characteristics of the present invention, and without departing from the spirit and scope thereof, can make changes or modification in the invention to adapt it to various usages and conditions.

What is claimed is:

1. A space-efficient heating and air conditioning module, comprising:
    A) a plurality of radially inwardly directed air handling ducts for selectively receiving a singular or combined flow of air into the module;
    B) a rotary air blower adapted to receive the radially inward flow of air from said air handling ducts and discharge the air in a direction coaxial with the axis of rotation of said rotary air blower;
    C) an evaporator for receiving the flow therethrough of air from the rotary air blower in a direction substantially normal to a face of said evaporator, said evaporator adapted to circulate therethrough a quantity of refrigerant for cooling the air flowing therethrough;
    D) a heating element spaced-apart from the evaporator, for receiving the flow therethrough of air from said evaporator in a direction substantially normal to a face of said heating element, said heating element adapted to thermally stratify the air flowing therethrough, the face of said heating element being substantially equal in area to the face of said evaporator;
    E) means for selectively distributing the flow of air from the heating element to any one or a combination of floor, panel, and defrost ducts, said distributing means adapted to provide the thermally stratified warmer air from said heating element to the floor duct; and
    F) a defrost supply duct for receiving a flow therethrough of air from said distributing means, for communicating the flow of air above the evaporator and heating element in a direction substantially 180° from the direction of flow of air through said rotary blower, evaporator, and heating element.

2. The space-efficient heating and air conditioning module according to claim 1, wherein the radially inwardly directed air handling ducts comprise an outside air duct and a recirculating air duct.

3. The space-efficient heating and air conditioning module according to claim 1, wherein the space between the evaporator and the heater element is sufficient to substantially prevent rehumidification of the air entering said heater element.

4. The space-efficient heating and air conditioning module according to claim 1, wherein the heating element is an engine coolant heater core.

5. The space-efficient heating and air conditioning module according to claim 1, wherein the evaporator is tilted slightly from a position parallel to the heating element.

6. In a vehicle comprising a substantially centrally mounted space-efficient heating and air conditioning module, the improvement wherein the module is that of claim 1.

7. A space-efficient heating and air conditioning module, comprising:
    A) a plurality of radially inwardly directed air handling ducts for selectively receiving a singular or combined flow of air into the module;
    B) a rotary air blower adapted to receive the radially inward flow of air from said air handling ducts and discharge the air in a direction coaxial with the axis of rotation of said rotary air blower;
    C) an evaporator for receiving the flow therethrough of air from the rotary air blower in a direction substantially normal to a face of said evaporator, said evaporator adapted to circulate therethrough a quantity of refrigerant for cooling the air flowing therethrough;
    D) a heater core spaced-apart from the evaporator, for receiving the flow therethrough of air from said evaporator in a direction substantially normal to a face of said heater core, said heater core adapted to circulate therethrough a quantity of engine coolant for heating the air flowing therethrough, said heater core additionally adapted to receive the engine coolant at the bottom of said heater core and discharge the engine coolant at the top of said heater core to thermally stratify the air flowing therethrough, the face of said heater core being substantially equal in area to the face of said evaporator;

E) means for selectively distributing the flow of air from the heater core to any one or a combination of floor, panel, and defrost ducts, said distributing means adapted to provide the thermally stratified warmer air from said heater core to the floor duct; and F) a defrost duct for receiving a flow therethrough of air from said distributing means, for communicating the flow of air above the evaporator and heater core in a direction substantially 180° from the direction of flow of air through said rotary blower, evaporator, and heat exchanger.

8. In a vehicle comprising a substantially centrally mounted space-efficient heating and air conditioning module, the improvement wherein the module is that of claim 7.

* * * * *